US011247597B2

(12) United States Patent
Cooper

(10) Patent No.: US 11,247,597 B2
(45) Date of Patent: Feb. 15, 2022

(54) ACCESSORIES FOR A CLIPBOARD

(71) Applicant: David T. Cooper, Clinton Township, MI (US)

(72) Inventor: David T. Cooper, Clinton Township, MI (US)

(*) Notice: Subject to any disclaimer, the term of this patent is extended or adjusted under 35 U.S.C. 154(b) by 0 days.

(21) Appl. No.: 16/587,074

(22) Filed: Sep. 30, 2019

(65) Prior Publication Data

US 2020/0101885 A1 Apr. 2, 2020

Related U.S. Application Data

(60) Provisional application No. 62/738,493, filed on Sep. 28, 2018.

(51) Int. Cl.
*B60N 3/00* (2006.01)
*B60R 7/04* (2006.01)
*B60R 11/02* (2006.01)
*B42F 9/00* (2006.01)
*B60R 11/00* (2006.01)

(52) U.S. Cl.
CPC .............. *B60N 3/005* (2013.01); *B42F 9/002* (2013.01); *B60R 7/04* (2013.01); *B60R 11/02* (2013.01); *B60R 11/0241* (2013.01); *B60R 11/0252* (2013.01); *B60R 2011/001* (2013.01)

(58) Field of Classification Search
CPC ........... B60N 3/005; B42F 9/002; B60R 7/04; B60R 11/02; B60R 11/0241; B60R 11/0252
See application file for complete search history.

(56) References Cited

U.S. PATENT DOCUMENTS 1,593,166 A 7/1926 Flach
1,977,507 A * 10/1934 Edwards ................. B43L 3/008
224/276

(Continued)

FOREIGN PATENT DOCUMENTS

CA 2083567 A1 * 5/1994 ............. B60N 3/005
CA 2194915 A1 * 7/1998 ............. B60N 3/005

(Continued)

OTHER PUBLICATIONS

"Clipboards for Steering Wheel", Jul. 2017, found at http://www.steeringwheelclipboards.com.

(Continued)

*Primary Examiner* — Stanton L Krycinski
(74) *Attorney, Agent, or Firm* — E.D. Jorgenson Law, LLC; Eric Jorgenson

(57) ABSTRACT

The accessories include an accessory board that functions in several ways for the desired purposes of the clipboard user. Generally, the accessory board functions as a work surface that can be oriented differently for different purposes. For example, the accessory board can be oriented predominantly horizontally to facilitate the placement and support for the use of a computing device such as a laptop computer. The accessory board can be oriented in a predominantly oblique angle as a tray which supports objects resting at one edge of the accessory board, for the placement of items in support of personal hygiene such as the application of cosmetics, grooming, mounting a mirror, etc., for the placement of food/drink items.

20 Claims, 15 Drawing Sheets

(56) References Cited

U.S. PATENT DOCUMENTS

| | | | |
|---|---|---|---|
| 2,211,962 A * | 8/1940 | Morris | B60N 3/005 224/400 |
| 3,042,958 A | 7/1962 | Spears | |
| 3,074,745 A * | 1/1963 | Burckhalter | B43L 3/008 108/44 |
| 3,643,606 A * | 2/1972 | Vise | B60N 3/005 108/44 |
| 3,952,988 A * | 4/1976 | Easterly | B43L 3/008 248/447.1 |
| 4,453,788 A * | 6/1984 | Russell | B60N 3/005 108/44 |
| D286,894 S * | 11/1986 | Haas | D19/113 |
| D292,445 S * | 10/1987 | Judge | D12/177 |
| 4,749,161 A * | 6/1988 | Falcone | B60N 3/005 108/44 |
| 4,969,623 A * | 11/1990 | Bernier | B64D 43/00 248/441.1 |
| 4,974,805 A * | 12/1990 | Douglas | B60N 3/005 108/44 |
| 4,995,637 A * | 2/1991 | Muraishi | B60N 3/005 108/44 |
| 5,060,581 A * | 10/1991 | Malinski | B60N 3/005 108/44 |
| 5,177,665 A * | 1/1993 | Frank | B60R 11/0252 108/44 |
| 5,385,283 A * | 1/1995 | Shioda | B60N 3/005 224/276 |
| 5,386,785 A * | 2/1995 | Naor | B60N 3/005 108/44 |
| 5,413,035 A * | 5/1995 | Fernandez | B60N 3/005 100/44 |
| 5,487,521 A * | 1/1996 | Callahan | B60N 3/005 248/441.1 |
| 5,542,314 A * | 8/1996 | Sullivan | B60R 11/0252 211/119 |
| 5,558,026 A * | 9/1996 | Seibert | B60N 3/005 108/44 |
| 5,642,674 A * | 7/1997 | Joye, Sr. | A47B 23/002 108/25 |
| 5,823,574 A * | 10/1998 | Sullins | B42F 9/002 281/45 |
| D401,544 S * | 11/1998 | Corsetti | D12/177 |
| 5,845,585 A * | 12/1998 | Meeus | B60N 3/005 108/44 |
| 5,878,672 A * | 3/1999 | Ostermann | B60N 3/004 108/25 |
| D409,962 S * | 5/1999 | Demont | D12/177 |
| 6,062,145 A * | 5/2000 | Lin | B60N 3/005 108/44 |
| D443,649 S * | 6/2001 | Citron | D12/177 |
| D444,178 S * | 6/2001 | Citron | D12/177 |
| 6,408,769 B1 * | 6/2002 | Lewis | B60N 3/005 108/44 |
| 6,412,425 B1 * | 7/2002 | Chen | B60N 3/005 108/44 |
| 7,017,878 B2 * | 3/2006 | Guo | B60N 3/005 108/42 |
| 7,363,865 B2 * | 4/2008 | Rubenstein | B60N 3/005 108/165 |
| 7,364,129 B1 * | 4/2008 | Levari, Jr. | A45C 13/00 108/4 |
| 7,469,871 B2 * | 12/2008 | Cooper | A47B 31/06 224/276 |
| D611,544 S * | 3/2010 | Liptan | D19/88 |
| 8,020,829 B1 * | 9/2011 | Tamayori | F16M 11/14 108/144.11 |
| 8,079,312 B2 * | 12/2011 | Long | B60N 3/005 108/152 |
| 8,096,517 B1 * | 1/2012 | Hamilton | B60R 11/0252 248/308 |
| 8,177,183 B2 * | 5/2012 | Reinen | A47B 23/043 248/126 |
| 8,327,774 B1 * | 12/2012 | Rivera | B60N 3/005 108/44 |
| 8,608,037 B2 * | 12/2013 | Stroh | B60N 3/005 108/44 |
| 9,021,963 B1 * | 5/2015 | Jacobsen | A45C 9/00 108/44 |
| 9,333,925 B2 * | 5/2016 | Wright | B60R 11/02 |
| D805,973 S * | 12/2017 | Mullaney | D12/177 |
| 9,908,448 B2 * | 3/2018 | Van Blarcom | B60N 3/005 |
| 10,251,478 B2 * | 4/2019 | Fryshman | A47B 23/043 |
| 10,369,935 B1 * | 8/2019 | Petrie | B60N 3/005 |
| 2004/0083930 A1 * | 5/2004 | Han | B60R 11/0252 108/44 |
| 2004/0144196 A1 * | 7/2004 | Thomas | B60N 3/005 74/558 |
| 2006/0032410 A1 * | 2/2006 | Miller | A47B 13/02 108/44 |
| 2006/0054759 A1 * | 3/2006 | Pollman | A63B 57/00 248/231.61 |
| 2006/0107878 A1 * | 5/2006 | Cassata | B60N 3/005 108/44 |
| 2006/0175519 A1 * | 8/2006 | Kull | B42F 9/002 248/441.1 |
| 2011/0057006 A1 * | 3/2011 | Smith | B60R 11/0252 224/276 |
| 2011/0259690 A1 * | 10/2011 | Clayton | G09F 1/10 190/109 |
| 2012/0018472 A1 * | 1/2012 | Totani | B60R 11/0252 224/276 |
| 2017/0152990 A1 * | 6/2017 | Kielland | G03B 17/561 |
| 2018/0055217 A1 * | 3/2018 | Fryshman | A47B 23/043 |

FOREIGN PATENT DOCUMENTS

| | | | | |
|---|---|---|---|---|
| CA | 2340127 A1 * | 3/2000 | | B60N 3/005 |
| DE | 4233889 A1 * | 4/1994 | | F16M 13/00 |
| DE | 19613898 A1 * | 10/1997 | | B60N 3/005 |
| DE | 29909265 U1 * | 12/1999 | | B60N 3/005 |
| DE | 10025765 A1 * | 5/2002 | | B60N 3/005 |
| DE | 102008053758 B3 * | 1/2010 | | B60R 11/0252 |
| EP | 2746134 A1 * | 6/2014 | | B62D 1/04 |
| FR | 2909328 A1 * | 6/2008 | | B60N 3/005 |
| GB | 1303101 A * | 1/1973 | | B60N 3/005 |
| GB | 1550899 A * | 8/1979 | | B60N 3/005 |
| JP | 08282190 A | 10/1996 | | |
| WO | WO-0124659 A1 * | 4/2001 | | B60N 3/005 |
| WO | WO-2005028246 A1 * | 3/2005 | | B60N 3/005 |
| WO | WO-2007035135 A1 * | 3/2007 | | B60N 3/005 |

OTHER PUBLICATIONS

"Wheelboard—Steering Wheel Clipboard", Jul. 2017, found at https://www.wheel-board.com.

"Chief Steering Wheel Desk", Jul. 2017, found at https://chiefsupply.com/products/kmw-specialties-inc-steering-wheel-desk-notebook-size-ndesk.

* cited by examiner

ACCESSORIES FOR A CLIPBOARD

CROSS-REFERENCE TO RELATED APPLICATIONS

This application claims the benefit of U.S. Provisional Patent application Ser. No. 62/738,493 entitled "ACCESSORIES FOR A CLIPBOARD" and filed Sep. 28, 2018, the entirety of which is incorporated by reference herein. This application is related to U.S. Pat. No. 7,469,871 issued Dec. 30, 2008, assigned Ser. No. 11/048,546, and entitled "UNIVERSAL CLIPBOARD".

BACKGROUND

Portable computing devices, such has tablets and cellular telephones are ubiquitous for use in offices, homes, and the highly mobile society of people and employees. Such portable computing devices include hardware and software computing resources for both personal and business purposes, such as interfacing to business databases and other business-related data, calendars, client intercommunications, etc. While such computing devices are more efficient in many ways, the display footprint of such devices is inadequate to enable users to multitask when choosing to interact in combination with paper items, which can more easily be utilized on larger flat surfaces such as desk surfaces.

However, given that users frequently travel/commute in vehicles such as cars and trucks, a more convenient system is needed to provide a portable work surface that enables the user to use the computing devices, and paper items, for example, a more organized and efficient manner.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed system comprises an add-on item (accessory) to a clipboard. The add-on item can be an accessory board that functions in several ways for the desired purposes of the clipboard user. Generally, the accessory board functions as a work surface that can be oriented differently for different purposes. For example, the accessory board can be oriented predominantly horizontally to facilitate the placement and support for the use of a computing device such as a laptop computer.

In another example use, the accessory board can be oriented in a predominantly oblique angle as a tray that supports objects resting at one edge of the accessory board. In yet another example use, the accessory board can be oriented for the placement of items in support of personal hygiene such as the application of cosmetics, grooming, mounting a mirror, etc. In still another use, the accessory board can be oriented for the placement of food/drink items in support of consumption. These are only a few examples of the many orientations and useful purposes of the accessory board. For example, in yet another example use, the accessory board can be oriented for the placement of papers for reading and writing.

The accessory board can be interfaced to the clipboard (e.g., circular, rectangular, etc.). As previously indicated, the accessory board functions to enable the use of computing devices such as tablet computing devices, laptop computers, cellular phones, etc., and non-computing items such as food, papers, cosmetics, grooming products, etc., to be positioned on the accessory board for user interaction. The positioning is flexible on the board, such as side-by-side, above or below another item on the board, and so on.

The accessory board can be constructed as having a single-panel (a "main panel"), or as having multiple panels ("multi-panel") which includes the main panel and a secondary panel. In either case of the single-panel or multi-panel board, the accessory board can include a "lip" along one perimeter edge (the lower edge or a "long side") against which items can be rested and supported to prevent such items from sliding off the board when the accessory board is obliquely oriented.

The accessory board is further constructed to accommodate the utilization of one or more types of attachment mechanism, which provide stable use of the accessory board when used in combination with the clipboard, for example, or other suitable (compatible) surfaces. For example, an attachment mechanism can include a "single cup" design of suction cups captured in the board so as to enable the suction cups to engage (e.g., temporarily) the compatible surface (e.g., clipboard surface) to provide a secure and stable attachment to the clipboard. Alternatively, the attachment mechanism, employed alone or in combination with the single cups, can include a "double cup" design of double suction cups captured in the accessory board so as to enable the double suction cups (and possibly one or more single cups) to engage (e.g., temporarily) the compatible surface (e.g., clipboard surface) to provide a secure and stable attachment to the clipboard.

In yet another implementation, the attachment mechanism can comprise hook-and-loop technology (one brand of which is called Velcro™). Thus, the two pieces determined to be attached or interfaced each employ one to the other of the hook technology or the loop technology, which are designed to work together.

In still another implementation, the attachment mechanism can comprise a combination of attachment technologies, where the accessory board interfaces to the clipboard via at least one of a hook-and-loop technology, the single-cup suction cup technology, and/or the double-cup suction cup technology.

In the multi-panel implementation, the accessory board includes the main panel and the secondary panel. The secondary panel can be constructed to include the attachment mechanism(s) which enable the stable use of the accessory board when used in combination with a clipboard, for example, or other compatible (e.g., flat) surfaces. Thus, the main panel becomes the primary surface of the accessory board on which items can be placed, positioned, leaned, oriented, attached, etc.

The secondary panel can be connected to the main panel in a way that enables the main panel to move freely relative to the secondary board. For example, where the secondary panel and main panel are made of some form of plastic, the secondary panel can connect to the main panel using two or more hinges. Thus, while the secondary panel is attached to the clipboard or other suitable surface using one or more of the attachment technologies, the main panel can rotate about the hinge axis for orientation in the desired way. The accessory board can be predominantly a rectangular design; however, a single panel or multi-panel circular design would also be useful.

In still another implementation, an accessory board is provided, comprising a main panel on which one or more items can be placed to enable user interaction therewith, and a secondary panel connected to the main panel, the secondary panel comprises an attachment mechanism which enables attachment of the secondary panel to a clipboard. The attachment mechanism enables attachment of the accessory board to a circular portion of the clipboard, which is circular.

The accessory board further comprises a connector mechanism that connects the secondary panel to the main panel. The connector mechanism comprises at least one plastic hinge that connects the secondary panel to the main panel along an upper long side. The main panel moves freely relative to the secondary panel. The main panel further comprises a lip along a lower long side on which the one or more items rest in a usable orientation. The main panel further comprises an attachment material on which a compatible item can be put and held in place until moved or removed.

The accessory board interfaces to an auxiliary board via the attachment mechanism of the secondary panel. The accessory board is used in combination with the clipboard to enable a portable work surface compatible with a vehicle steering wheel.

In yet another implementation, an accessory board is provided, comprising: a main panel on which one or more items can be placed to enable user interaction therewith, the main panel is rectangular in shape and comprises a lip constructed along a main panel long side of the main panel and extends perpendicular to a surface of the main panel, and on which the one or more items can rest; and, a secondary panel connected to the main panel via at least one connector mechanism, the secondary panel comprises at least one attachment mechanism which enables attachment of the secondary panel to a clipboard.

The attachment mechanism enables attachment of the accessory board to a circular portion of the clipboard, which is circular. The connector mechanism comprises at least one plastic hinge that connects the secondary panel to the main panel along an upper long side. The main panel swivels freely relative to the secondary panel. The lip of the main panel extends along a lower long side on which the one or more items rest in a usable orientation. The main panel further comprises an attachment material on which a compatible item can be put and held in place until moved or removed. The accessory board interfaces to an auxiliary board via the attachment mechanism of the secondary panel. The accessory board is used in combination with the clipboard to enable a portable work surface compatible with a vehicle steering wheel.

In another implementation, an accessory board is provided, comprising: a main panel on which one or more items can be placed to enable user interaction therewith, the main panel is rectangular in shape and comprises a lip constructed along a main panel long side of the main panel and extends perpendicular to a surface of the main panel, and on which the one or more items can rest; and, a secondary panel connected to the main panel via at least one connector mechanism, the secondary panel comprises at least one attachment mechanism which enables attachment of the secondary panel to a clipboard, the main panel swivels about a hinged axis relative to the secondary panel. The accessory board attaches to the clipboard to enable a portable work surface compatible with a vehicle steering wheel. The accessory board attaches to an auxiliary board to enable a portable work clipboard surface compatible with a vehicle steering wheel.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
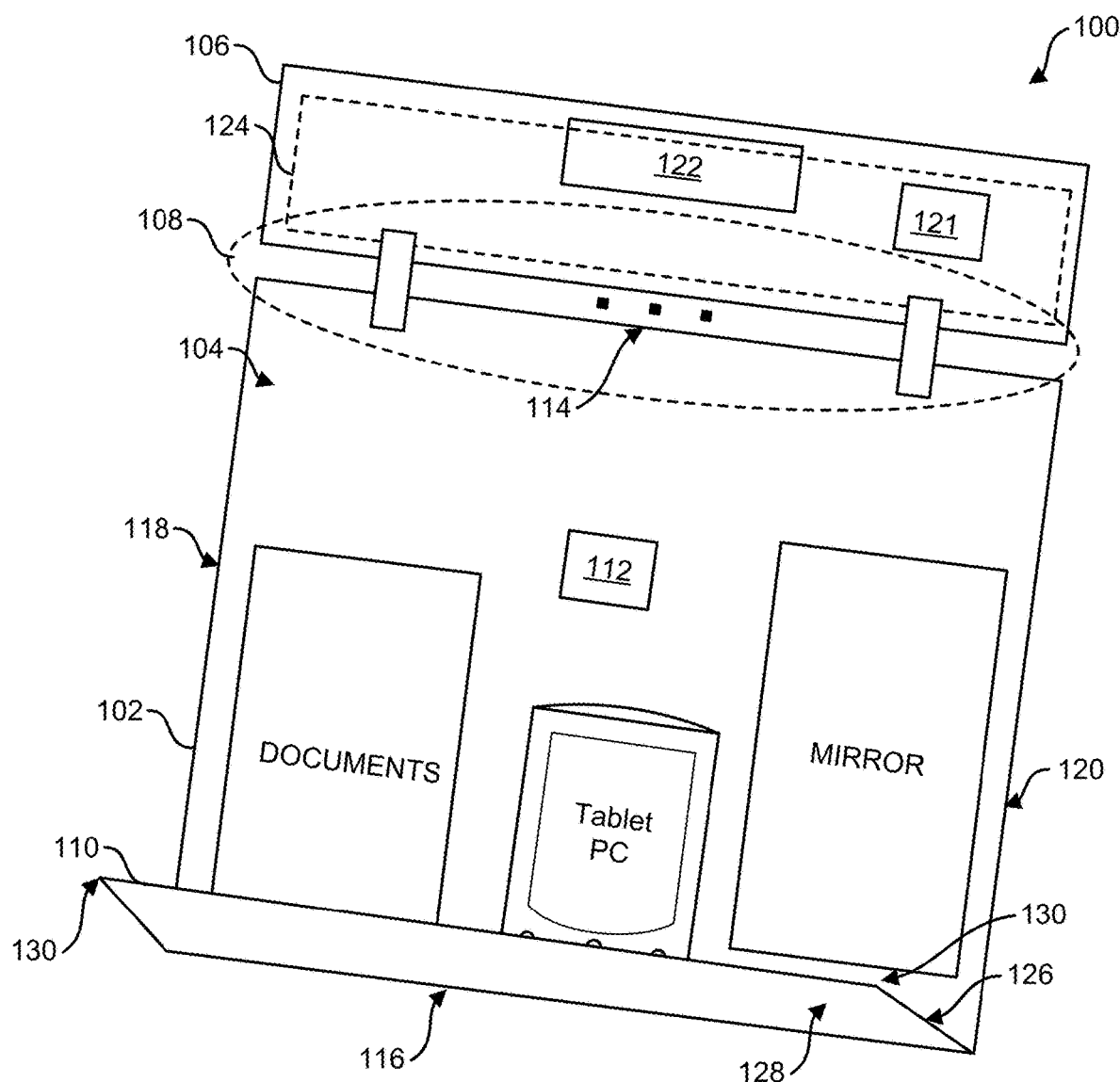
FIG. 1 illustrates an accessory board in accordance with the disclosed architecture.

The disclosed architecture is an add-on item (accessory) to a clipboard. The add-on item can be an accessory board that functions in several ways for the desired purposes of the clipboard user. Generally, the accessory board functions as a work surface that can be oriented differently for different purposes. For example, the accessory board can be oriented predominantly horizontally to facilitate the placement and support for the use of a computing device such as a laptop computer. The accessory board can be oriented in a predominantly oblique angle as a tray which supports objects resting at one edge of the accessory board, for the placement of items in support of personal hygiene such as the application of cosmetics, grooming, mounting a mirror, etc., for the placement of food/drink items.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. The intention is to cover all modifications, equivalents, and alternatives falling within the spirit and scope of the claimed subject matter.

FIG. 1 illustrates an accessory board 100 in accordance with the disclosed architecture. The accessory board 100 can comprise a main panel 102 on which one or more items 104 can be placed to enable user interaction therewith, and a secondary panel 106 connected to the main panel 102. The main panel 102 connects to the secondary panel 106 via a connector mechanism (or technology) 108 (the connector mechanism 108 generally located by a dashed line ellipse and/or an ellipsis ( . . . ) between two generalized representations of connectors to indicate one or more connectors). Thus, the connector mechanism 108 can comprise one or more of the same or different types of connector(s), such as hardware hinges, soft hinges of a durable and flexible material, tethers, loops, wires, straps (e.g., Velcro™), etc., suitable to maintain the connection between the main and secondary panels (102 and 106).

The main panel 102 can be constructed of a light-weight and durable material such as plastic, lightweight metal (e.g., aluminum), a flexible material limited in an amount of flex, etc. In another implementation, the main panel 102 can be constructed to include a light-weight and durable magnetic material whereby items (e.g., tablet, cell phone, mirror, metal document holder, paper pads, writing instruments, etc.) fitted with a magnet can be attached to the main panel 102 magnetically to hold the items in place.

Similarly, the secondary panel 106 can be constructed of a light-weight and durable material such as plastic, light-weight metal (e.g., aluminum), a flexible material limited in an amount of flex, etc. As with the main panel 102, the secondary panel 106 can be constructed to include a light-weight and durable magnetic material whereby items (e.g., pens, cell phone, mirror, etc.) fitted with a magnet or constructed with magnetic materials can be magnetically attached to the secondary panel 106 to hold the items in place on the secondary panel 106.

In an alternative implementation, the main panel 102 can comprise areas of selected attachment material. For example, one section can include magnetic material, a second section can include hook-and-loop material, and a third section can retain the surface material (e.g., smooth plastic) of the main panel 102 for attachment of items capable of using suction cups to temporarily attach to the main panel 102.

The main panel 102 is shown as also comprising a lip 110 against which one or more of the items 104 can rest when the main panel 102 is in one of the many user-defined positions capable with the accessory board 100. The lip 110 is a constructed to extend perpendicular to the vehicle driver-facing surface 112 of the main panel 102, and on which the one or more items 104 can rest. The lip 110 can be a rectangular piece of material of the same composition as the main panel 102. The lip 110 can have a top surface 126 on which zero, one or more items 104 can rest, and an opposing bottom surface 128 that will typically face downward and contact the user's lap and/or abdomen when the accessory board 100 is in a substantially vertical orientation (e.g., attached to a vehicle steering wheel) or substantially horizontal orientation (e.g., the main panel 102 rotated upward such that the bottom surface 128 of the lip 110 faces the user abdomen or waist).

The main panel 102 can be rectangular in shape (but can be any geometric shape as desired, such as circular, elliptical, etc., yet suitable for the intended function of supporting the items for convenient user access and usage), having a length defined as the distance between long sides: an upper long side 114 and a lower long side 116, and a width defined as the distance between short sides: a left short side 118 and a right short side 120.

The lip 110 can extend the entire width of the lower long side 116; however, this is not a requirement, as the lip 110 can be shorter in length than the lower long side 116. The lip 110 can be designed to have rounded corners rather than the substantially pointed (right angle) corners 130 depicted.

The secondary panel 106 is shown as comprising a vehicle driver-facing surface 121, an attachment mechanism 122 generally located proximate a dashed-line 124, which dashed line 124 defines an area associated with attachment to an underlying surface such as of a clipboard or even a table top. The attachment mechanism 122 although indicated as a single block is intended to represent single and multiple types of attachment technologies (rubbers suction cups, tethers, hook-and-loop technology, etc.), that can employed within the boundaries of the secondary panel 106 and/or along edges (the perimeter) of the secondary panel 106, as described herein.

Figure 2:
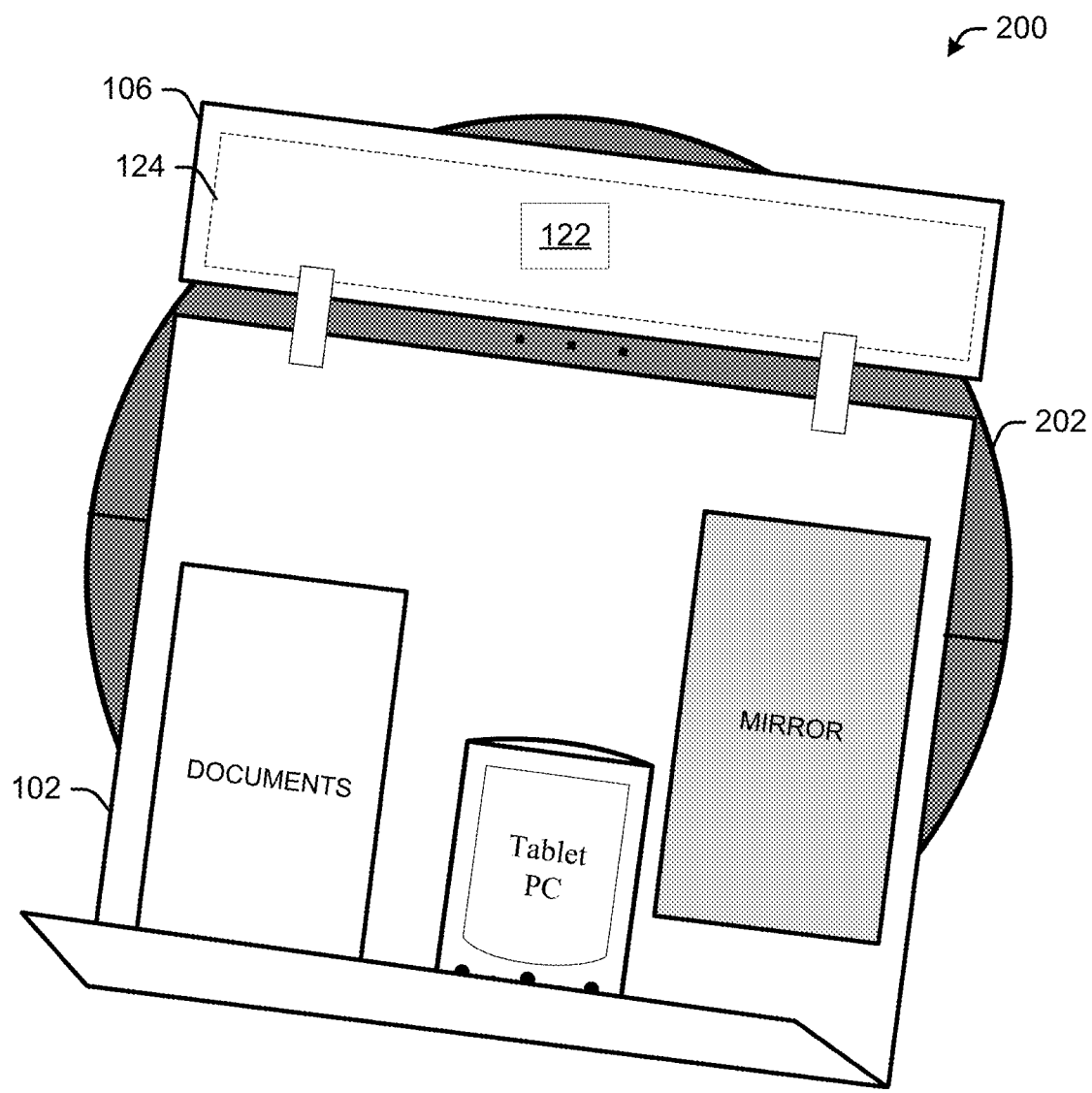
FIG. 2 illustrates a system which implements the accessory board in combination with a circular clipboard.

FIG. 2 illustrates a system 200 which implements the accessory board 100 in combination with a circular (and foldable) clipboard 202. The accessory board 100 employs the attachment mechanism 122 of the secondary panel 106 to attach the accessory board 100 to the circular clipboard 202. Note that while clipboard 202 is entirely circular, the accessory board 100 can be utilized with entirely rectangular clipboards, as well as a "modified" clipboard having a top panel that is semi-circular and a bottom panel that is rectangular.

Figure 3:
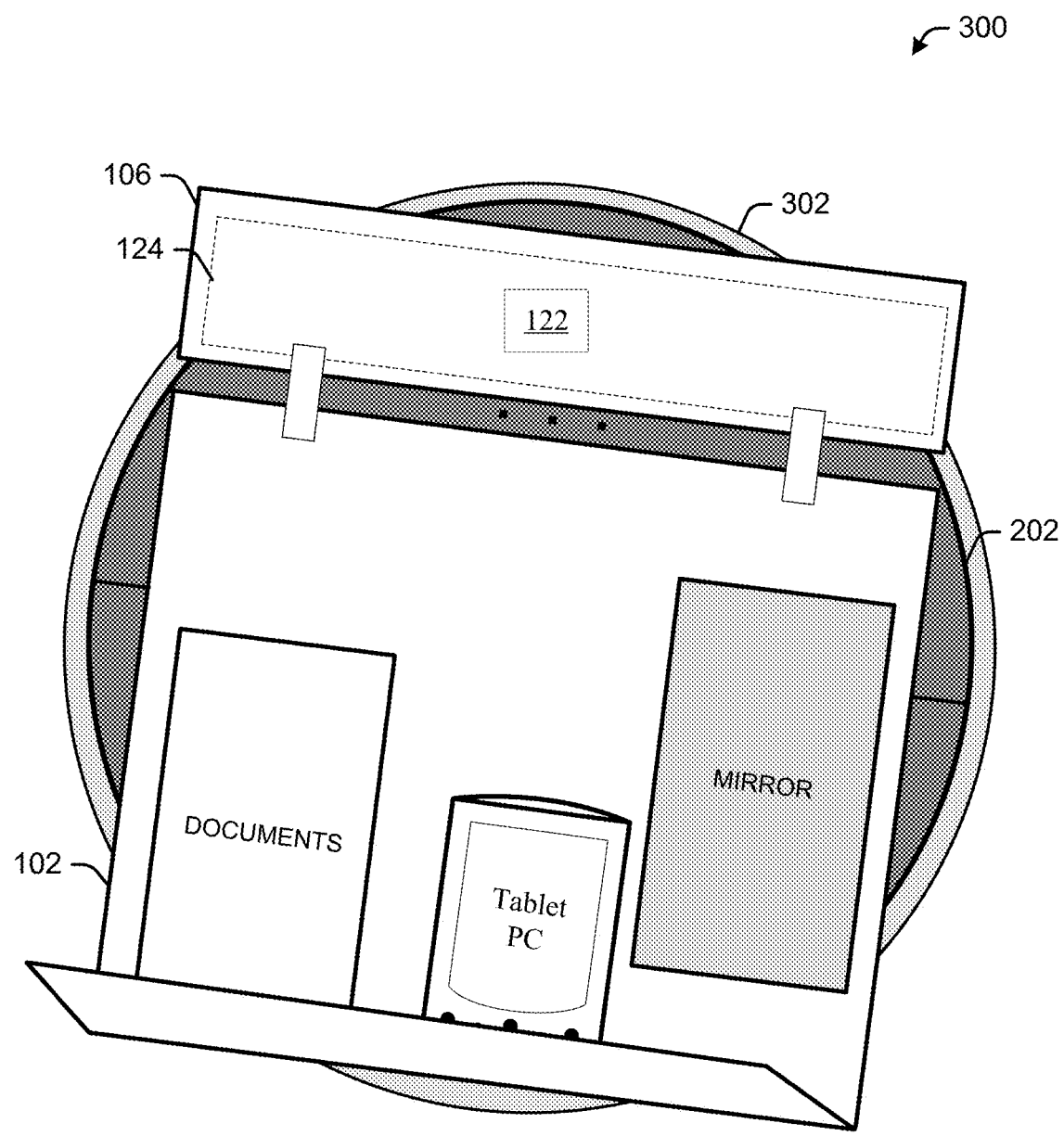
FIG. 3 illustrates a system which implements the accessory board in combination with a circular clipboard and a vehicle steering wheel.

FIG. 3 illustrates a system 300 which implements the accessory board 100 in combination with a circular clipboard 202 and a vehicle steering wheel 302. The circular clipboard 202 attaches to the vehicle steering wheel 302 by way of straps, for example, or other suitable techniques that secure the circular clipboard to the steering wheel 302. The accessory board 100 employs the attachment mechanism 122 of the secondary panel 106 to attach the accessory board 100 to the circular clipboard 202. Note that while clipboard 202 is entirely circular, the accessory board 100 can be utilized with entirely rectangular clipboards, as well as a "modified" clipboard having a top panel that is semi-circular and a bottom panel that is rectangular.

Figure 4:
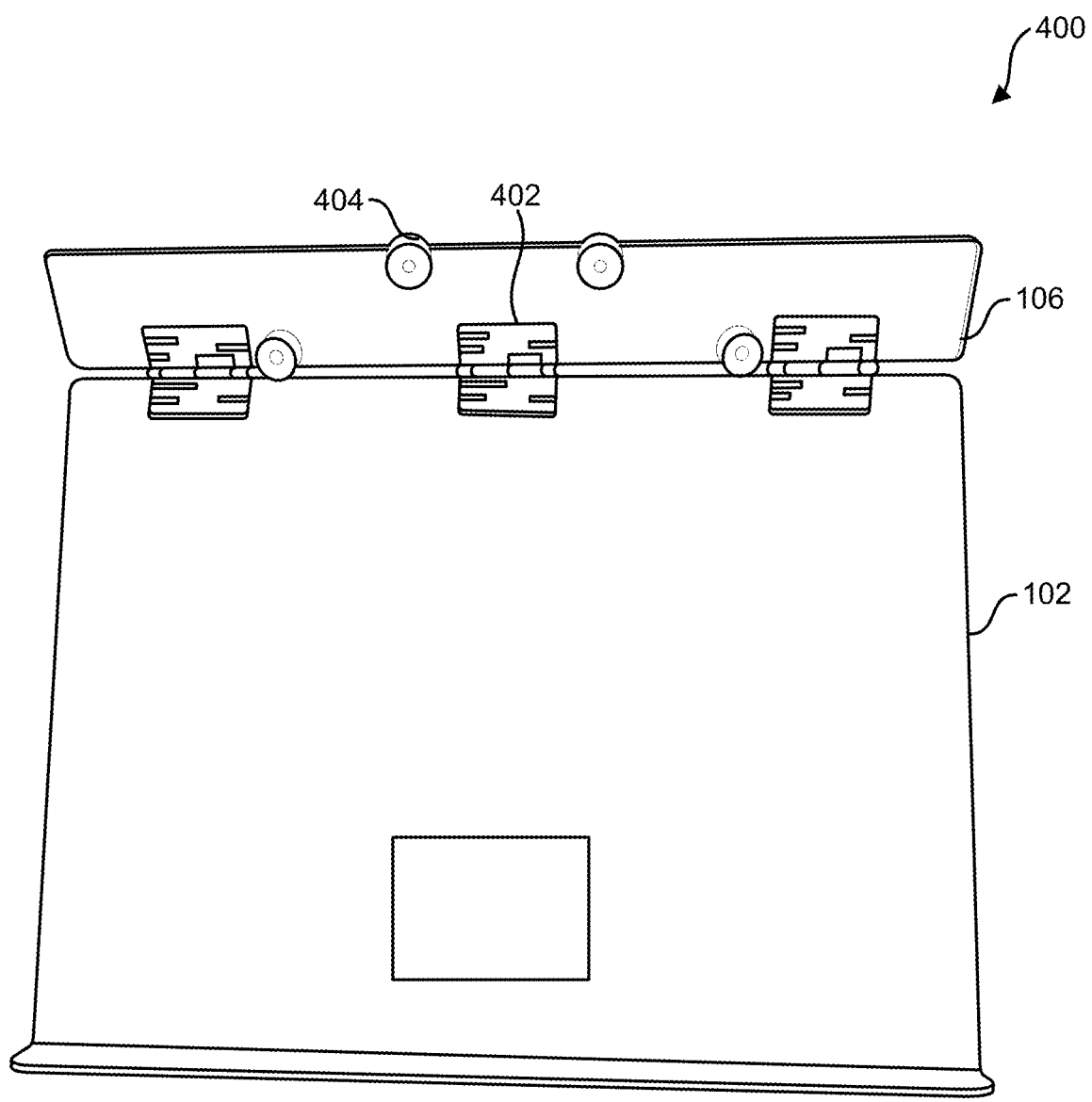
FIG. 4 illustrates an accessory board showing examples of specific connectors and attachment mechanism.

FIG. 4 illustrates an accessory board 400 showing examples of specific connectors and attachment mechanism 122. Here, the connectors which interconnect the main panel 102 and secondary panel 106 are plastic hinges 402. Thus, the main panel 102 is free to rotate around the axis of the hinges 402. Additionally, the attachment mechanism on the secondary panel 106 for this accessory board 400 includes four suction cups 404, and which are located in the secondary panel 106 to follow the curvature of the top of the circular clipboard 202 described herein. Note that the suction cups 404 can be made of a soft material such as rubber or a rubber composition, and can be singled-ended or doubled-ended suction cups.

Figure 5:
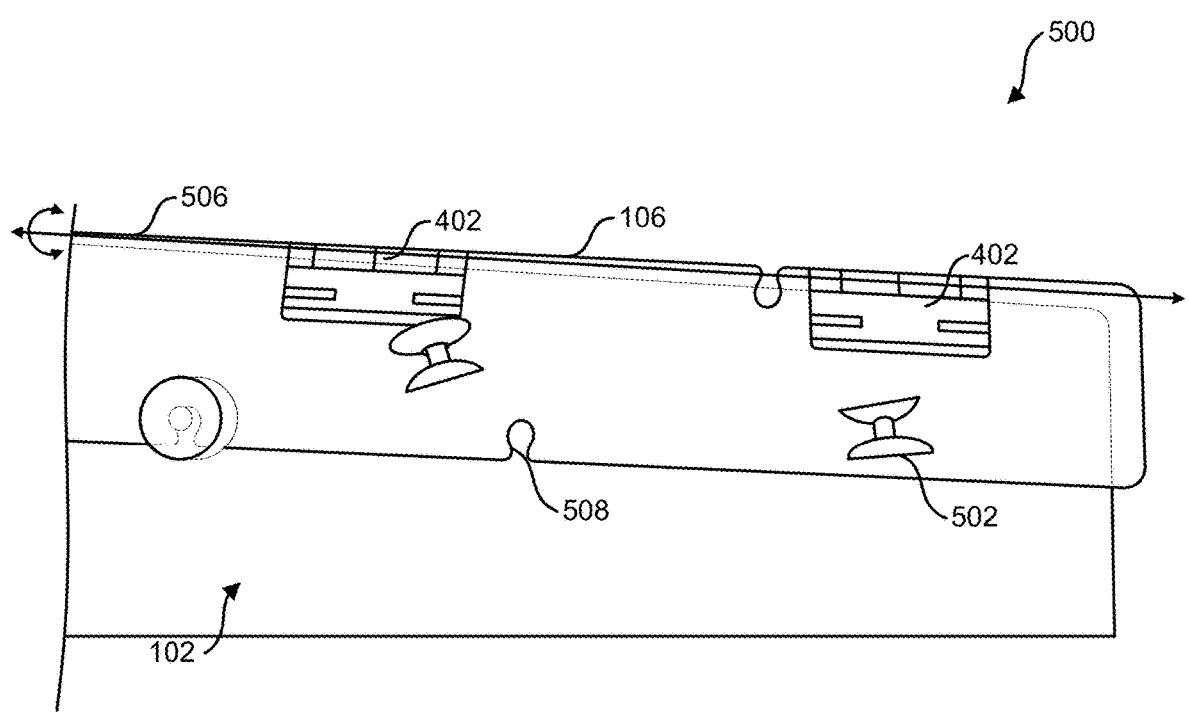
FIG. 5 illustrates an alternative system of a connector mechanism and an attachment mechanism for the accessory board.

FIG. 5 illustrates an alternative system of a connector mechanism (similar to connector mechanism 108) and an attachment mechanism (similar to attachment mechanism 122) for the accessory board 100. In this implementation, pliable double-ended suction cups 502 are employed (where "doubled-ended" means a suction cup on each of the opposite ends of the center stem of suction cup) as the attachment mechanism, and the plastic hinges 402 as the connector mechanism which interconnect the main panel 102 and secondary panel 106. Thus, the main panel 102 is free to rotate on (swivel about) the axis 506 of the hinges 402. Additionally, the attachment mechanism on the secondary panel 106 for this accessory board 100 includes four of the double-ended suction cups 502.

In this implementation, the secondary panel 106 comprises suction cup capture apertures 508 (e.g., holes, slots, etc.), which retain the suction cups 502, during use, for example. The user can replace the suction cups 502 if worn, through removal and insertion of the new suction cups in the apertures 508. As shown, the capture apertures 508 can be D-shaped slots created into and along a long edge of the secondary panel 106. It is to be appreciated that the capture apertures 508 can alternatively be constructed as through-holes in the secondary panel 106 rather than in an edge of a long side (between the long sides of the secondary panel 106). In yet another implementation, the apertures 508 employed can include both edge-type slots and through-holes in the secondary panel 106.

Figure 6:
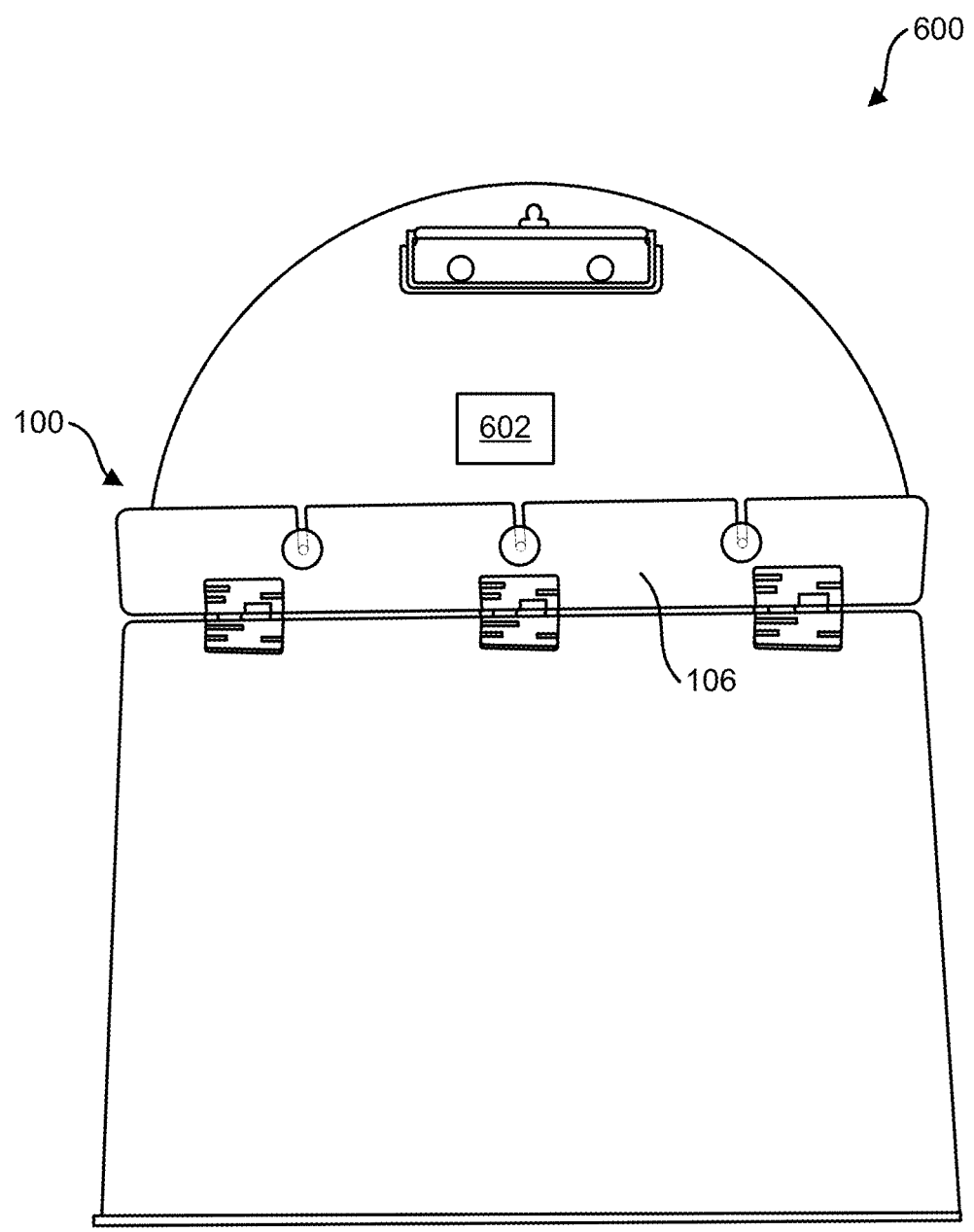
FIG. 6 illustrates an alternative accessory board system where the secondary panel of a connector mechanism and an attachment mechanism for the accessory board.

FIG. 6 illustrates an alternative accessory board system 600 where the secondary panel 106 of a connector mechanism (similar to connector mechanism 108) and an attachment mechanism (similar to attachment mechanism 122) for the accessory board 100. Here, three double-ended suction cups are employed (cup insertion is enabled along the external long edge of the secondary panel 106 into corresponding slotted holes, and where "external" is intended to mean the long edge opposite the hinged connector mechanism). The suction cups can then be pressed against the smooth upward surface of a circular (and foldable) clipboard 602 to maintain the position of the secondary panel 106, and hence, the overall position of the accessory board 100 relative to the clipboard 602.

Figure 7:
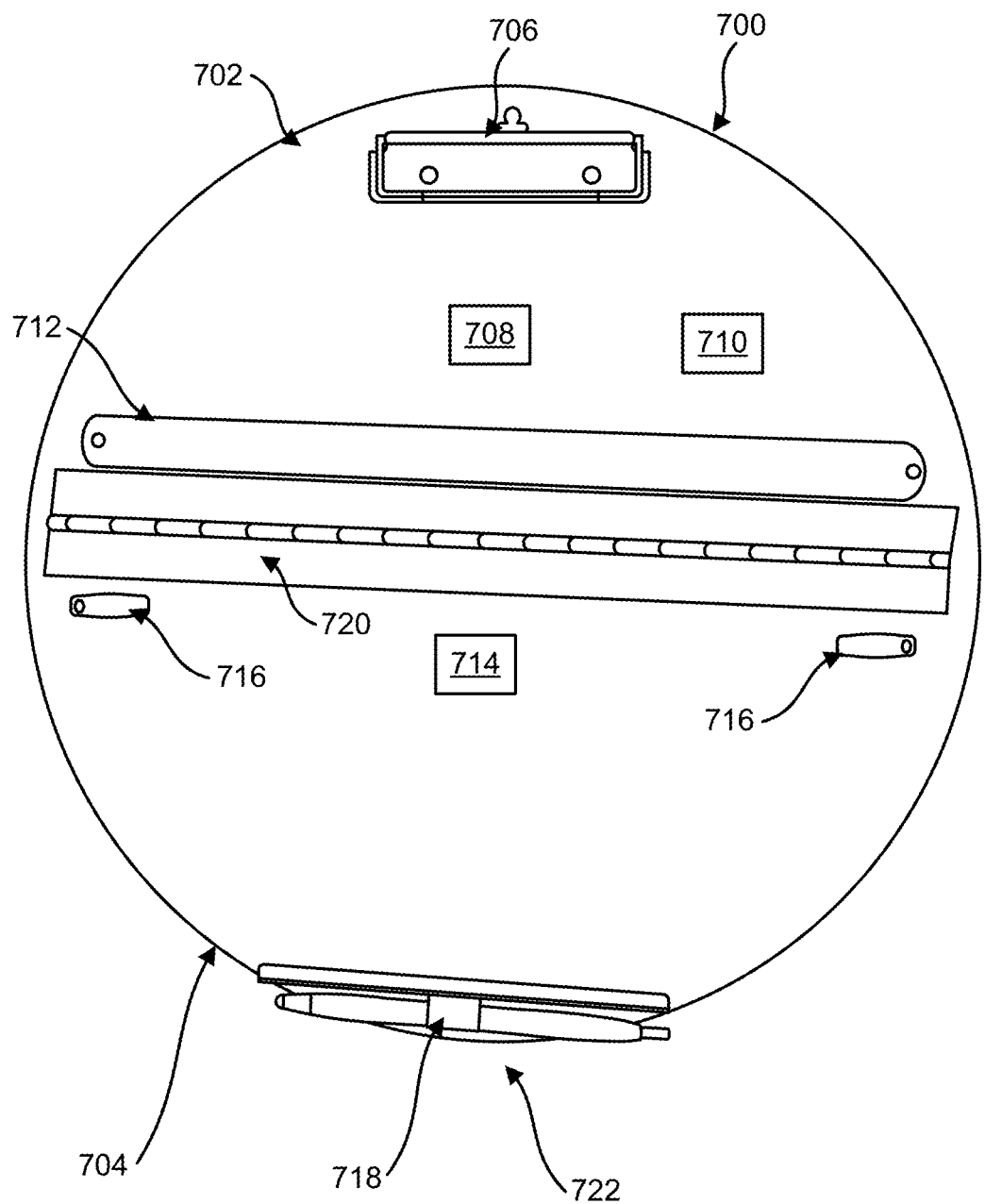
FIG. 7 illustrates an exemplary circular clipboard that can utilize the disclosed accessory board.

FIG. 7 illustrates an exemplary circular clipboard 700 (similar to clipboard 202) that can utilize the disclosed accessory board 100. The circular clipboard 700 comprises two semi-circular panels: an upper panel 702, and a lower panel 704. The upper panel 702 comprises a spring-loaded clamping apparatus 706 affixed on a front side 708 that enables the capture of items for use with the clipboard 700. For example, documents, papers, straps, pens, etc., or anything suitable for fitting into the clamping apparatus 706 can be captured therein for holding and re-positioning purposes. A back side 710 of the upper panel 702 includes a strap 712 which enables the positioning of the circular clipboard 700 on a vehicle steering wheel. The strap 712 can be elastic, having an elasticity sufficient to firmly hold the clipboard 700 to the steering wheel. Other mechanisms suitable for firmly holding the clipboard 700 to the steering wheel can be utilized. For example, two pliable hooks can be implemented on the back side 710 that when engage the steering wheel, will support the board 700 and firmly hold the clipboard 700 to the steering wheel.

The lower panel 704 comprises a front side 714 on which one or more clipping apparatus 716 are located to assist in retaining documents, papers, etc., to the front side of the clipboard 700. The clipping apparatus 716 include two (pliable) clips (made of flexible nylon) affixed to the lower panel 704 and one clip is disposed diametrically opposite to the other clip and proximately located near the circle diameter, where the upper panel 702 and lower panel 704 meet. More specifically, at the center of the circular clipboard 700 is its diameter. The diameter defines the line of separation between straight sides of the upper panel 702 to the lower panel 704, thereby separating the circular clipboard 700 into the two semi-circular panels—the upper panel 702 and the lower panel 704.

The upper panel 702 and lower panel 704 are connected by way of a hinge system 720 (e.g., plastic). The hinge system 720 can be designed to span nearly the entire length of the diameter. Using the hinge system 720, the two panels (702 and 704) can then be folded onto each other resulting in a final folded clipboard configuration the size of one semi-circular panel (702 or 704).

At the bottom of the lower panel 704 is located a pen/pencil holder clip 718 which retains a pen or pencil. Additionally, at the bottom of the lower panel 704 can be implemented a flat and horizontally oriented "lip", similar in general design as the lip of the accessory board 100, but for resting items on the bottom edge or location 722 of the circular clipboard 700.

Figure 8:
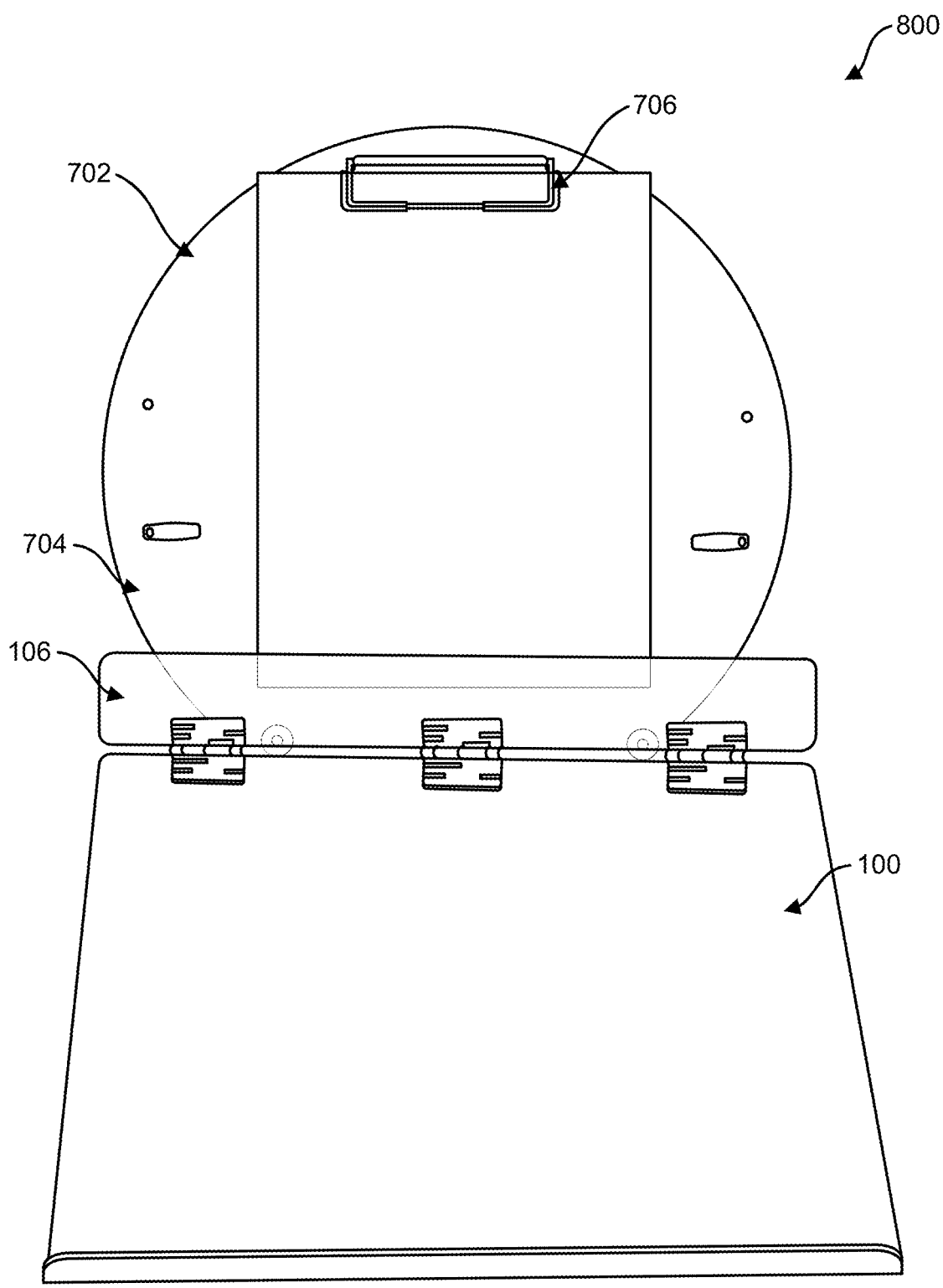
FIG. 8 illustrates a system where the accessory board is attached to the smooth surface of the lower panel of the circular clipboard.

FIG. 8 illustrates a system 800 where the accessory board 100 is attached to the smooth surface of the lower panel 704 of the circular clipboard 700. A paper is shown as clamped to the clipboard 700 using the clamping apparatus 706 of the upper panel. The secondary panel 106 employs suction cups to engage the lower panel 704 of the circular clipboard 700. The main panel 102 of the accessory board 100 then functions as an additional work surface on which to conduct work, place items, rest items against the lower lip, perform personal hygiene, or whatever the user chooses to do.

Figure 9:
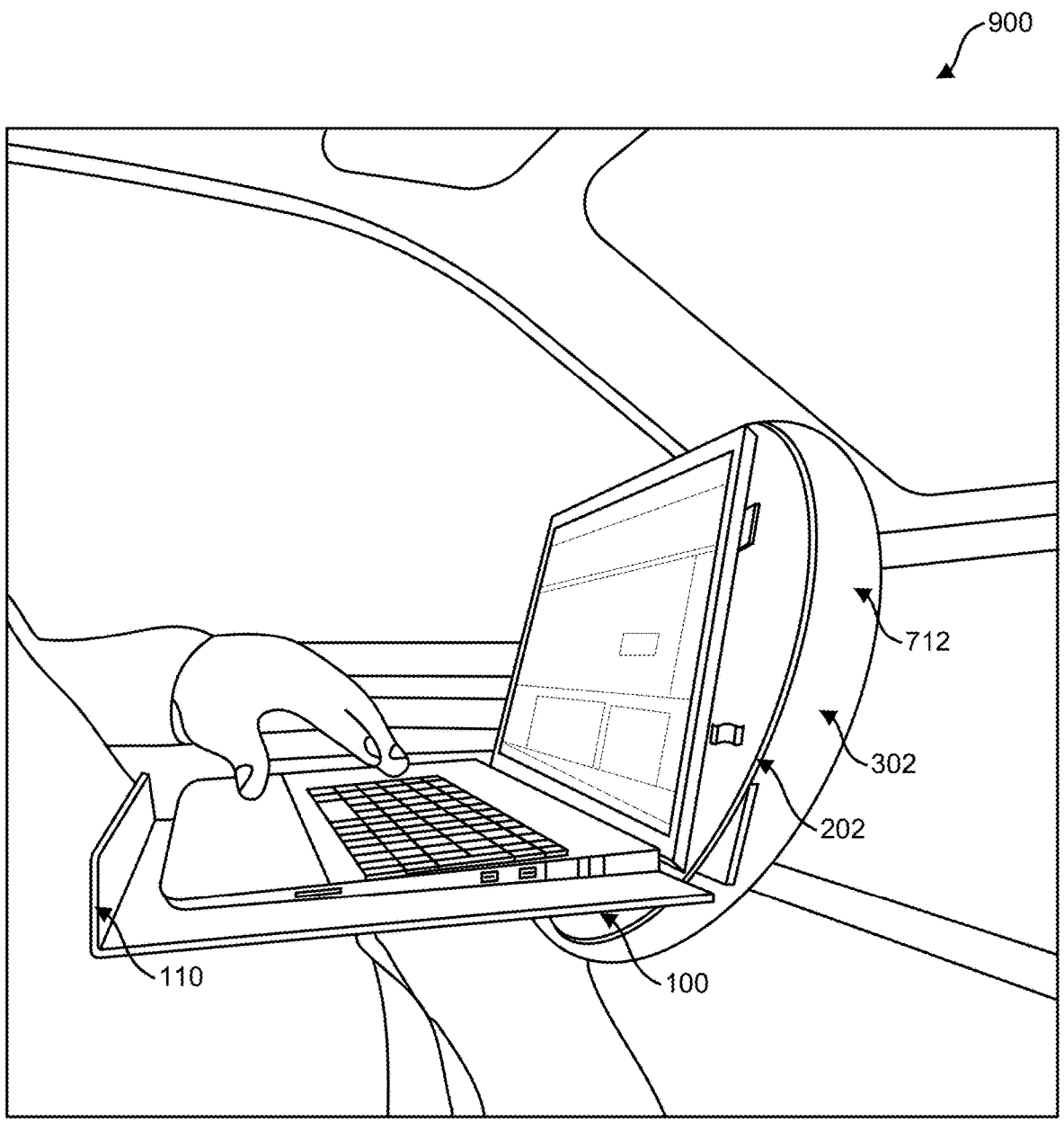
FIG. 9 illustrates the utilization of the accessory board and circular clipboard system on a vehicle steering wheel.

FIG. 9 illustrates the utilization of the accessory board and circular clipboard system 900 on a vehicle steering wheel 302. The circular clipboard 202 is firmly held in position on the steering wheel using the strap 712, which prevents the clipboard 202 from sliding downward in an out-of-position orientation. In other words, the strap 712, when pulled over the steering wheel 202, ultimately rests against the top of the steering column on the back side of the clipboard 202. Here, the main panel 102 of the accessory board 100 is shown in a predominantly horizontal position where a laptop computer can be set for user interaction. The lip 110 also prevent the laptop computer from sliding off the accessory board 100.

Figure 10:
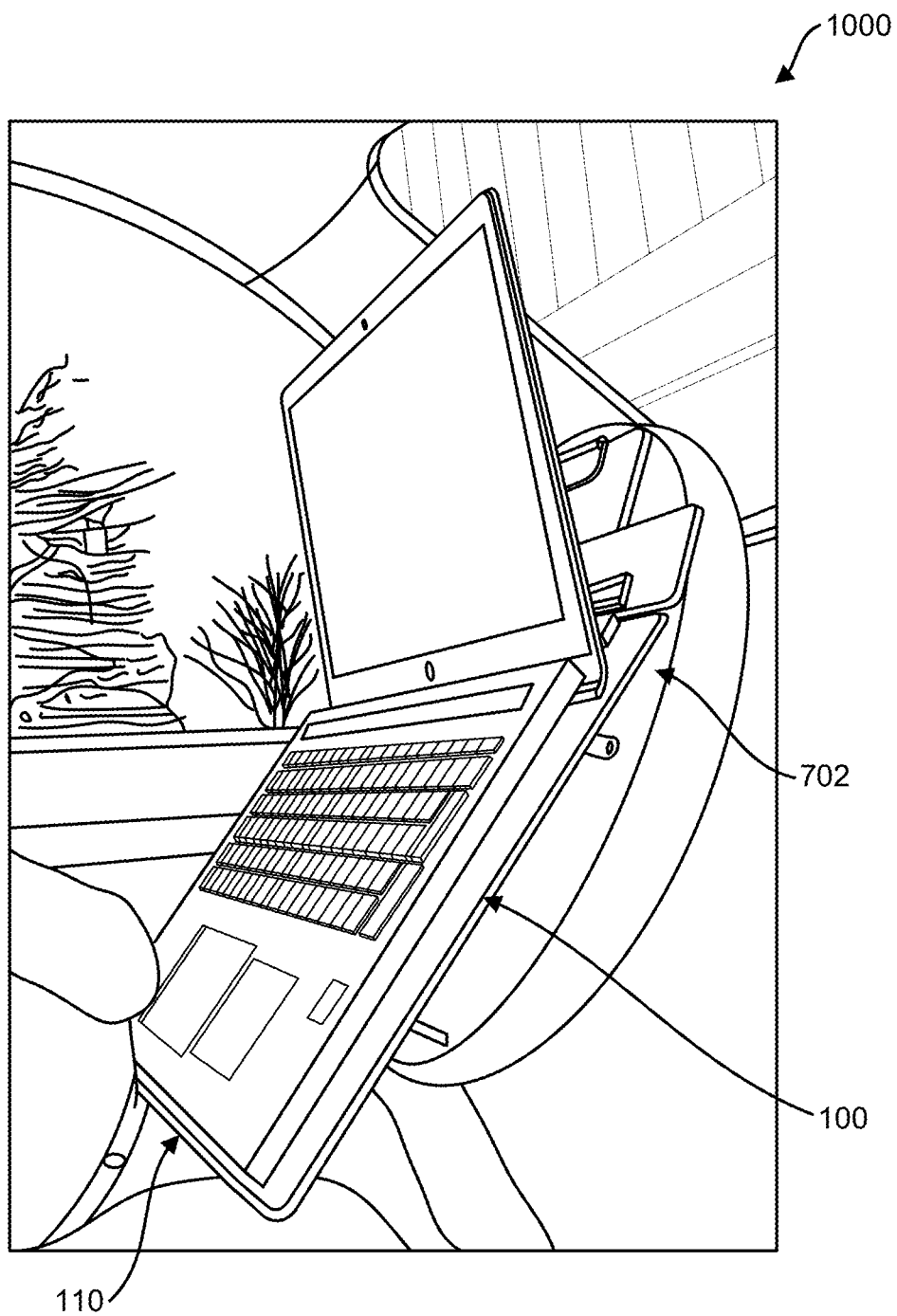
FIG. 10 illustrates an alternative utilization of the accessory board and circular clipboard system on the vehicle steering wheel.

FIG. 10 illustrates an alternative utilization of the accessory board and circular clipboard system 900 on the vehicle steering wheel 302. Here, the secondary panel 106 of the accessory board 100 attaches the accessory board 100 higher onto the clipboard 202 (above the hinged diameter) to a location on the upper panel 702. This results in the main panel 102 of the accessory board 100 orienting in a more sloped (or slanted) manner where the computer rests on the lip 110. This orientation offers to the user a more direct eye contact with the computer keyboard and the display.

Figure 11:
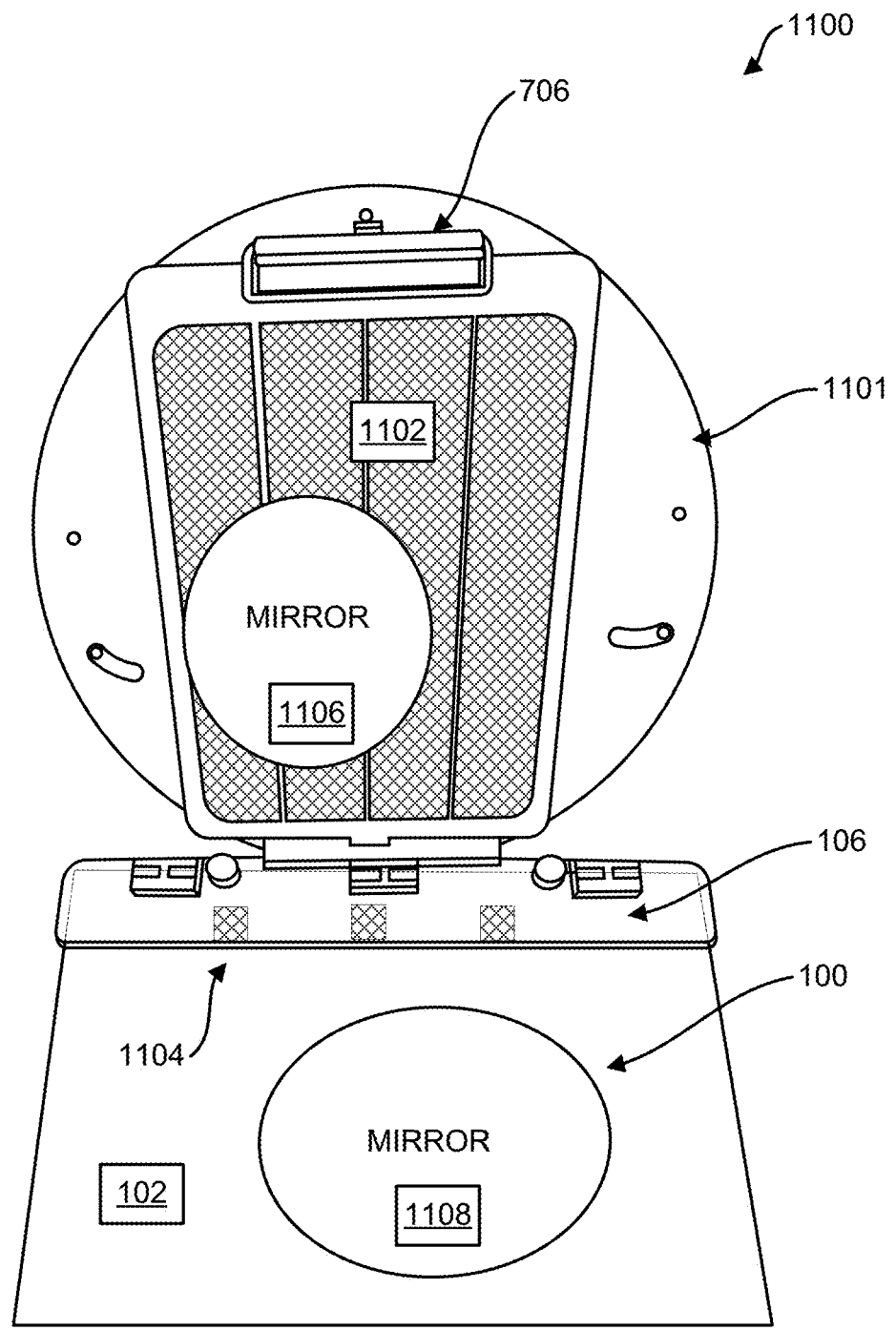
FIG. 11 illustrates the further utilization of an accessory board system where an auxiliary board is employed in combination with the accessory board and circular clipboard.

FIG. 11 illustrates the further utilization of an accessory board system 1100 where an auxiliary board 1102 is employed in combination with the accessory board 100 and a circular clipboard 1101 (similar to clipboard 202). The auxiliary board 1102 is designed to be clamped against the clipboard 1101 using the clipboard clamping apparatus 706. The auxiliary board 1102 includes hook-and-loop technology (one brand commonly known as VELCRO) such that any items (e.g., cell phone, camera, writing instruments, etc.) having a compatible part of the hook-and-loop technology attached thereto can be attached to the auxiliary board 1102. As shown here, the secondary panel 106 of the accessory board 100 comprises three (colored black, in this instance) hook-and-loop technology patches 1104, wherein the secondary panel 106 attaches to the auxiliary board 1102 where the user chooses to make the attachment. In the case the suction cups are not used. Thus, the secondary panel 106 can include multiple different types of attachment mechanisms, such as suction cups for attaching to a smooth flat surface, and one part (e.g., loops) of a hook-and-loop technology for attaching to the mating hook-and-loop part (e.g., hooks) on the auxiliary board 1102 or other similarly designed objects, items, clipboard, etc.

The accessory board system 1100 further illustrates the use of items such as mirrors by the user. Here, one type of circular mirror 1106 can employ a compatible part of the hook-and-loop technology on the mirror back to engage the auxiliary board 1102 at a position desired by the user. Similarly, an elliptical mirror 1108 can be utilized to sit or attach to the main panel of the accessory board 100 based on elevation or orientation of the main panel 102. For example, the back of the elliptical mirror 1108 can be equipped with a sticky material that prevents (or reduces) slippage of the mirror 1108 when placed on the main panel 102.

Figure 12:
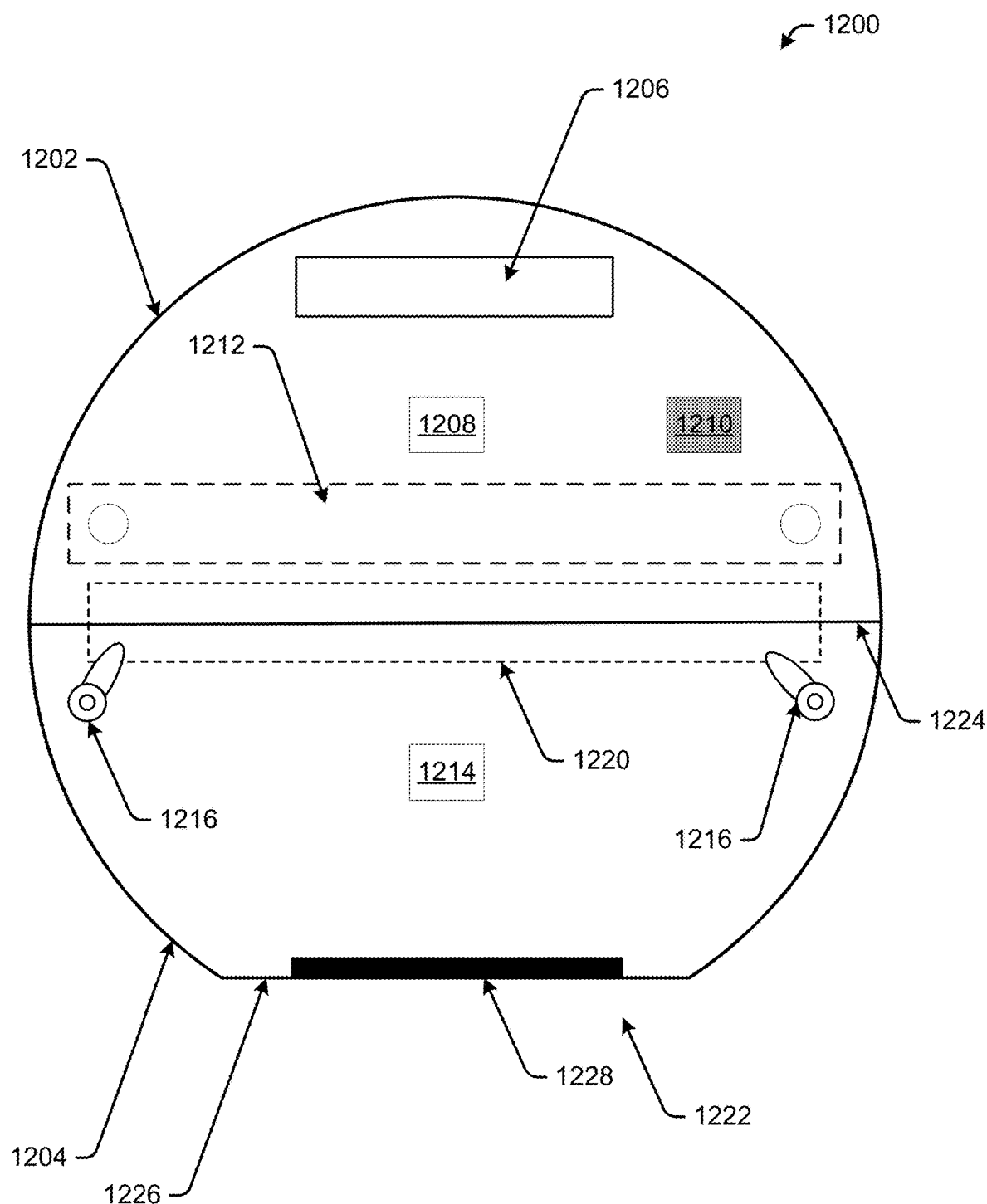
FIG. 12 illustrates an alternatively designed circular clipboard that can utilize the disclosed accessory board.

FIG. 12 illustrates an alternatively designed circular and foldable clipboard 1200 that can utilize the disclosed accessory board 100. The circular clipboard 1200 comprises two semi-circular panels: an upper semi-circular panel 1202, and a lower semi-circular panel 1204. The upper semi-circular panel 1202 comprises a spring-loaded clamping apparatus 1206 affixed on a front side 1208 that enables the capture of items for use with the clipboard 1200. For example, documents, papers, straps, pens, etc., or anything suitable for fitting into the clamping apparatus 1206 can be captured therein for holding and re-positioning purposes.

A back side 1210 of the upper semi-circular panel 1202 includes a strap 1212 which enables the positioning of the circular clipboard 1200 on a vehicle steering wheel. The strap 1212 can be elastic, having an elasticity sufficient to firmly hold the clipboard 1200 to the steering wheel. Other mechanisms suitable for firmly holding the clipboard 1200 to the steering wheel can be utilized. For example, two pliable hooks can be implemented on the back side 1210 that when engage the steering wheel perimeter, will support the board 1200 and firmly hold the clipboard 1200 to the steering wheel.

The lower semi-circular panel 1204 comprises a front side 1214 on which one or more clipping apparatus 1216 are located to assist in retaining documents, papers, etc., to the front side of the clipboard 1200. The clipping apparatus 1216 includes two (pliable retaining) clips (made of flexible nylon) affixed to the lower semi-circular panel 1204. One clip is disposed diametrically opposite to the other clip and proximately located near the circle diameter, where the upper semi-circular panel 1202 and lower semi-circular panel 1204 meet. More specifically, at the center of the circular clipboard 1200 is its diameter 1224. The diameter 1224 defines the line of separation between the straight side of the upper semi-circular panel 1202 and the straight side of the lower semi-circular panel 1204, thereby separating the circular clipboard 1200 into the two semi-circular panels— the upper semi-circular panel 1202 and the lower semi-circular panel 1204.

The upper semi-circular panel 1202 and lower semi-circular panel 1204 are connected by way of a hinge system 1220 (e.g., plastic). The hinge system 1220 can be designed to span nearly the entire length of the diameter. Using the hinge system 1220, the two semi-circular panels (1202 and 1204) can then be folded onto each other resulting in a final folded clipboard configuration the size of one semi-circular panel (1202 or 1204).

At the bottom of the lower semi-circular panel 1204 is located a pen/pencil holder clip 1218 which retains a pen or pencil. Additionally, at the bottom of the lower semi-circular panel 1204 can be implemented a flat and horizontally oriented "lip", similar in general design as the lip of the accessory board 100, but for resting items on the bottom edge or location 1222 of the circular clipboard 1200.

The differentiating design of the clipboard 1200 is the introduction of the flat section 1226 along the bottom edge of the clipboard 1200, that comprises a lip 1228 that is parallel to the diameter 1224 and in the same plane as the diameter 1224. The lip 1228 serves as an abutment against which items can be set and restricted from sliding off the clipboard 1200. The lip 1228 can extend along and up to the entire length of the flat section 1226.

In other words, disclosed and described herein is an accessory board, comprising: a main panel on which one or more items can be placed to enable user interaction therewith; and a secondary panel connected to the main panel, the secondary panel comprising at least one attachment mechanism which enables attachment of the secondary panel to a clipboard.

The main panel and secondary panel are rectangular in shape, the main panel comprises a main panel long side of length equal to a secondary panel long side of the secondary panel, the secondary panel and the main panel are interconnected along the secondary long side and the main panel long side. The main panel further comprises a lip constructed to extend perpendicular to a surface of the main panel, and on which the one or more items can rest, the lip extends between short sides of the main panel and on another main panel long side. The main panel is greater in width than width of the secondary panel.

The attachment mechanism of the secondary panel comprises at least one of hook parts of a hook-and-loop technology, loop parts of the hook-and-loop technology, or the hook parts and the loop parts of the hook-and-loop technology. The attachment mechanism of the secondary panel comprises suction cups that are captured in the secondary panel and that attach to a driver-facing surface of the clipboard. The attachment mechanism of the secondary panel comprises magnet technology that magnetically engages the secondary panel to a driver-facing surface of the clipboard via magnetism.

The secondary panel enables rotation of the main panel about connectors that connect the secondary panel to the main panel along proximate long sides of the secondary panel and main panel. The clipboard comprises a semi-circular part having a diameter that extends across opposite points of a vehicle steering wheel, the clipboard capable of being mounted on a driver-facing side of the vehicle steering wheel. The attachment mechanism is located in the secondary panel to enable the attachment mechanism to function within curvature of a semi-circular part of the clipboard, the clipboard having a diameter that extends across diametrically opposite points of a vehicle steering wheel.

In another implementation, an accessory board is disclosed, comprising: a main panel on which one or more items can be placed to enable user interaction therewith, the main panel is rectangular in shape and comprises a lip constructed along a main panel long side of the main panel and extends perpendicular to a surface of the main panel, and on which the one or more items can rest; and a secondary panel connected to the main panel via at least one connector technology, the secondary panel comprises at least one attachment mechanism which enables attachment of the secondary panel to a clipboard.

The attachment mechanism comprises at least one of a hook-and-loop technology or a suction cup technology. The secondary panel enables rotation of the main panel about the connector technology to a user defined position while the secondary panel is attached to the clipboard via the attachment mechanism. The attachment mechanism is located in the secondary panel to enable the attachment mechanism to function within curvature of a semi-circular part of the clipboard, the clipboard having a diameter that extends between diametrically opposite points of a vehicle steering wheel.

Figure 13:
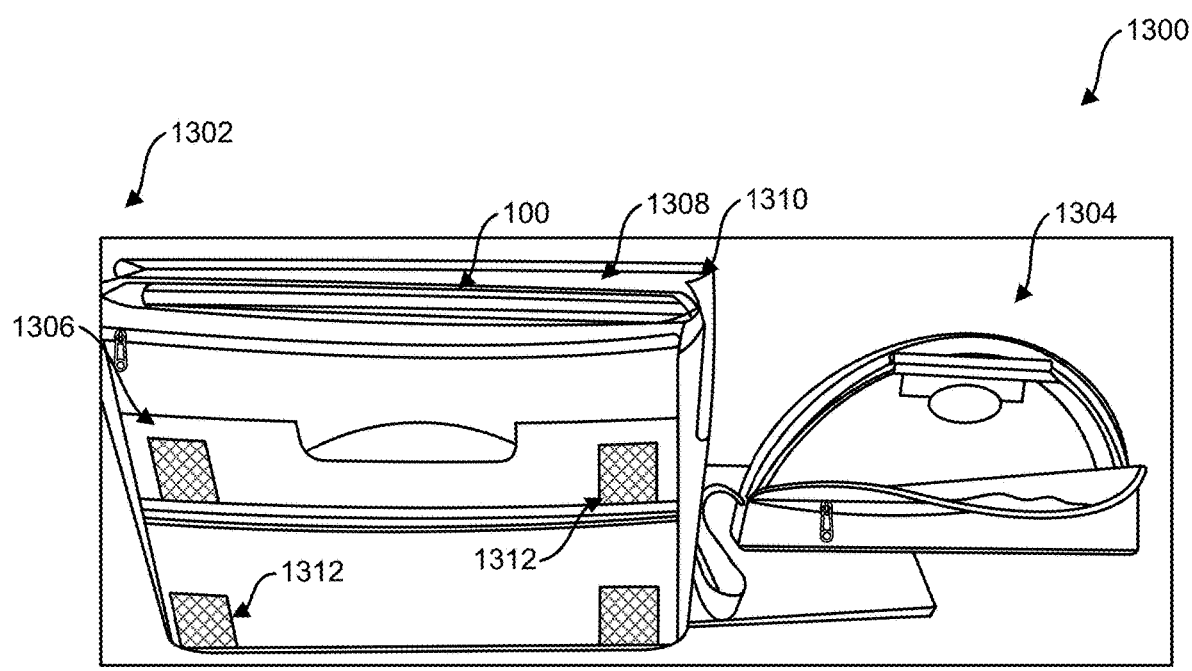
FIG. 13 illustrates a front view of carrying cases for a clipboard and clipboard accessories.

FIG. 13 illustrates carrying cases 1300 for a clipboard and clipboard accessories. A first carrying case 1302 comprises multiple pockets in which accessories can be inserted. A second carrying case 1304 enables cover and storage of the circular and foldable clipboards (202, 602, 700, 1101, 1200) using a zipable closure technique or other types of convenient closure technology, such as magnetics, snaps, etc. Here, the first carrying case 1302 includes a side pocket 1306 into which a foldable and circular clipboard (e.g., clipboard 202) can be inserted and carried. Alternatively, the foldable and circular clipboard (e.g., clipboard 202) can be inserted into the second carrying case 1304, which combination can then be inserted into the side pocket 1306 for carrying the entire set of accessories, papers, etc.

Additionally, first carrying case 1302 includes a larger pocket 1308 into which the accessory board 110 can be inserted with or without documents, papers, computing devices (e.g., tablet), and so on. A flip-over cover 1310 can also be provided that closes over the pockets of the first carrying case 1302 to secure the items in the pockets while carrying, placement on a chair, etc. The flip-over cover 1310 can securely attach to the side using hook-and-loop technology 1312.

Figure 14:
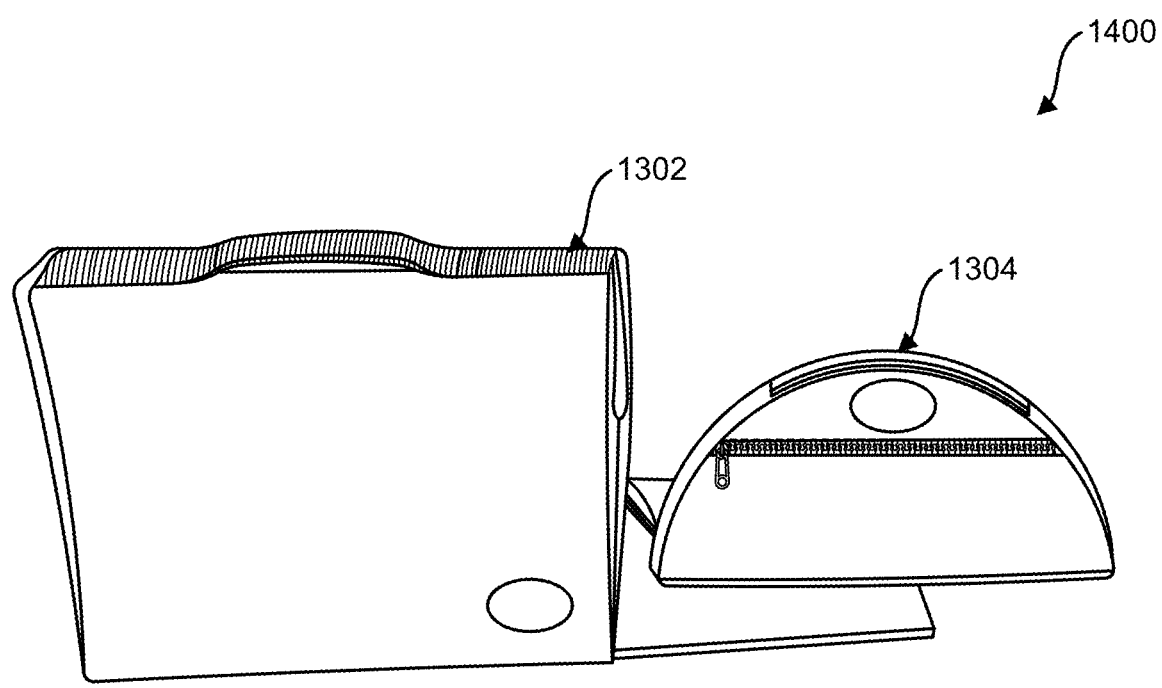
FIG. 14 illustrates a back view of the carrying cases for the clipboard and accessories.

FIG. 14 illustrates a back view 1400 of the carrying cases (1302 and 1304). The first carrying case 1302 is shown as comprising a carry handle to enable the user to carry the case 1302 and all items carried therein.

Figure 15:
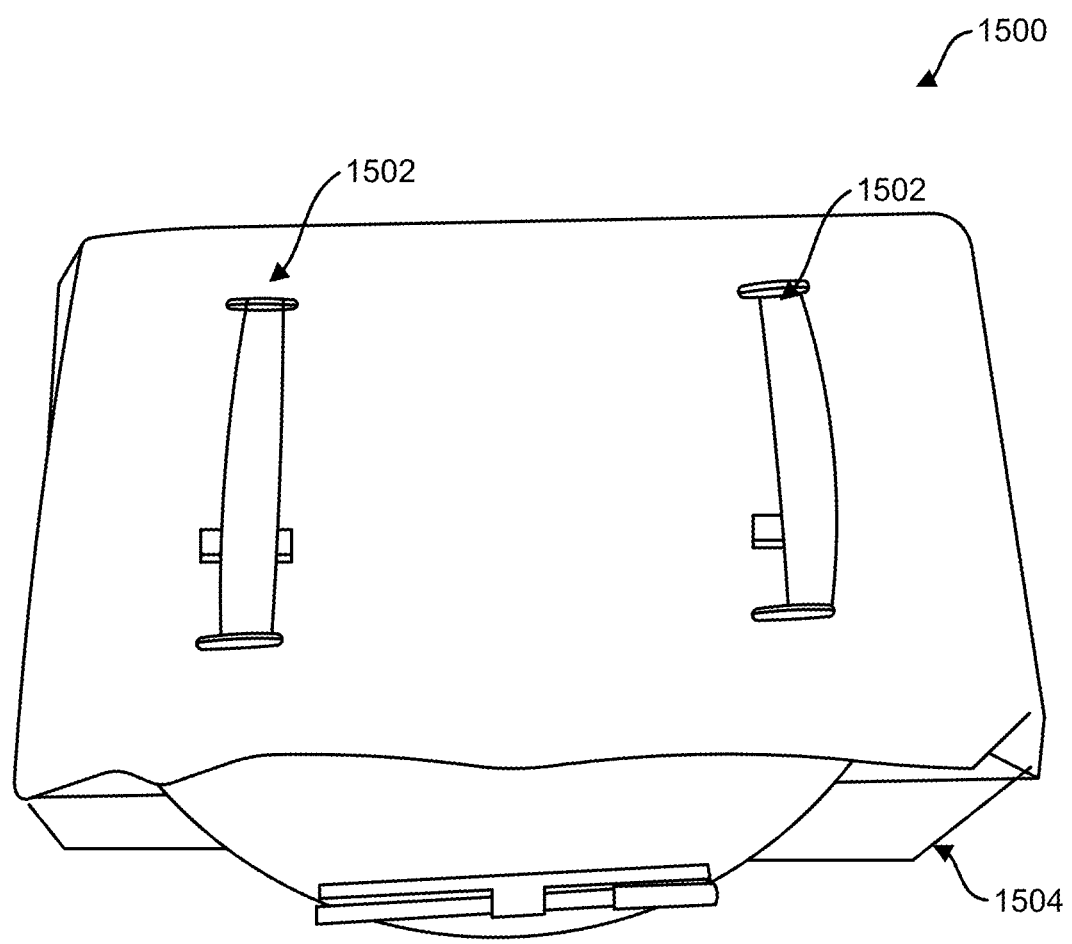
FIG. 15 illustrates a clipboard carrying case for the storage of a foldable and circular clipboard on a vehicle visor.

FIG. 15 illustrates a clipboard carrying case 1500 for the storage of a foldable and circular clipboard (e.g., clipboard 202) on a vehicle visor. Here, the case 1500 is sized to receive and hold the circular clipboard in a folded orientation, and sized to slide over a typical vehicle visor. The case 1500 comprises two elastic bands 1502 with suitable elasticity to support the clipboard and case 1500 against the underside of the driver-side visor without obstructing the view of the vehicle driver and/or a passenger when used on the passenger-side visor. The case 1500 can include a cover 1504 that closes (folds or flips) over the open side of the case 1500 to secure the clipboard therein when on the visor or not on the visor. The cover 1504 can be secured in a closed position using commonly-know techniques, including but not limited to, Velcro, for example, or snaps, zipper, buttons, magnetics, and so on.

What has been described above includes examples of the disclosed clipboards, clipboard accessories, and systems. It is, of course, not possible to describe every conceivable combination of components, but one of ordinary skill in the art may recognize that many further combinations and permutations are possible. Accordingly, the novel system is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An accessory board of two panels, comprising:
   a main panel on which one or more items can be placed to enable user interaction therewith; and
   a secondary panel connected to the main panel, the secondary panel comprises an attachment mechanism which enables temporary engagement of the secondary panel to a driver-facing side of a surface mounted on a steering wheel of a vehicle, the secondary panel mounted in a same plane as the surface, wherein the surface is part of a clipboard mounted on the steering wheel, the secondary panel enables use of a clamping apparatus of the clipboard to capture an item for use of at least one of the item or the main panel.

2. The accessory board of claim 1, wherein the attachment mechanism enables attachment of the accessory board to a circular portion of the clipboard, which is a circular clipboard.

3. The accessory board of claim 1, further comprising a connector mechanism that connects the secondary panel to the main panel.

4. The accessory board of claim 3, wherein the connector mechanism comprises at least one plastic hinge that connects the secondary panel to the main panel along an upper long side.

5. The accessory board of claim 1, wherein the main panel moves freely relative to the secondary panel.

6. The accessory board of claim 1, wherein the main panel further comprises a lip along a lower long side on which the one or more items rest in a usable orientation.

7. The accessory board of claim 1, wherein the main panel further comprises an attachment material on which a compatible item can be put and held in place until moved or removed.

8. The accessory board of claim 1, wherein when an auxiliary board can be clamped directly to the surface of the clipboard via the clamping apparatus, the accessory board interfaces to the auxiliary board via the attachment mechanism of the secondary panel.

9. The accessory board of claim 1, wherein the accessory board is used in combination with the clipboard to enable a portable work surface compatible with a vehicle steering wheel.

10. An accessory board of two panels, comprising:
    a main panel on which one or more items can be placed to enable user interaction therewith, the main panel is rectangular in shape and comprises a lip constructed along a main panel long side of the main panel and extends perpendicular to a surface of the main panel, and on which the one or more items can rest; and
    a secondary panel connected to the main panel via at least one connector mechanism, the secondary panel comprises at least one attachment mechanism which enables temporary engagement of the secondary panel to a driver-facing side of a surface mounted on a steering wheel of a vehicle, wherein the surface can be part of a clipboard mounted on a vehicle steering wheel, the secondary panel enables use of a clamping apparatus of the clipboard to capture an item for use of the item and the main panel.

11. The accessory board of claim 10, wherein the attachment mechanism enables attachment of the accessory board to a circular portion of the clipboard, which is circular.

12. The accessory board of claim 10, wherein the connector mechanism comprises at least one plastic hinge that connects the secondary panel to the main panel along an upper long side.

13. The accessory board of claim 10, wherein the main panel swivels freely relative to the secondary panel.

14. The accessory board of claim 10, wherein the lip of the main panel extends along a lower long side on which the one or more items rest in a usable orientation.

15. The accessory board of claim 10, wherein the main panel further comprises an attachment material on which a compatible item can be put and held in place until moved or removed.

16. The accessory board of claim 10, wherein when an auxiliary board can be clamped directly to the surface of the clipboard via the clamping apparatus, the accessory board interfaces to the auxiliary board via the attachment mechanism of the secondary panel.

17. The accessory board of claim 10, wherein the accessory board is used in combination with the clipboard to enable a portable work surface compatible with a vehicle steering wheel.

18. An accessory board of two panels, comprising:
a main panel on which one or more items can be placed to enable user interaction therewith, the main panel is rectangular in shape and comprises a lip constructed along a main panel long side of the main panel and extends perpendicular to a surface of the main panel, and on which the one or more items can rest, the main panel further comprises an attachment material on which a compatible item can be put and held in place until moved or removed; and
a secondary panel connected to the main panel via at least one connector mechanism, the secondary panel comprises at least one attachment mechanism which enables temporary engagement of the secondary panel to a surface, the main panel swivels about a hinged axis relative to the secondary panel, wherein the secondary panel enables use of a clamping apparatus of a clipboard to capture an item for use of the item and the main panel, and wherein the attachment mechanism enables attachment of the accessory board to the clipboard while the clipboard is mounted on a steering wheel of a vehicle, the secondary panel mounted in a same plane as the surface.

19. The accessory board of claim 18, wherein the accessory board attaches to the clipboard to enable a portable work surface compatible with the steering wheel.

20. The accessory board of claim 18, wherein when an auxiliary board can be clamped directly to the surface of the clipboard via the clamping apparatus, the accessory board attaches to the auxiliary board to enable a portable work clipboard surface compatible with the steering wheel.

* * * * *